United States Patent [19]
Feldpausch

[11] Patent Number: 5,246,175
[45] Date of Patent: Sep. 21, 1993

[54] APPARATUS FOR MAKING FROZEN FOODS

[76] Inventor: David Feldpausch, 737-11 Woodside La. E., Sacramento, Calif. 95238

[21] Appl. No.: 856,348

[22] Filed: Mar. 23, 1992

[51] Int. Cl.⁵ .............................................. B02C 19/00
[52] U.S. Cl. ...................... 241/101.8; 99/510; 99/455; 99/517; 366/195; 366/196; 366/289
[58] Field of Search ............ 241/101.8, 77, 78; 366/194, 195, 196, 289; 99/455, 517, 509, 510, 484

[56] References Cited

U.S. PATENT DOCUMENTS

| | | | |
|---|---|---|---|
| 749,286 | 1/1904 | Gerner | 366/224 X |
| 2,132,364 | 10/1938 | Thompson | 366/161 X |
| 2,513,974 | 7/1950 | Thomas | 99/513 X |
| 2,864,419 | 12/1958 | Woock | 99/513 |
| 3,818,716 | 6/1974 | Carpigiani | 62/343 X |
| 3,976,001 | 8/1976 | Trovinger | 99/513 |
| 4,630,930 | 12/1986 | Seiling | 366/194 X |
| 4,758,097 | 7/1988 | Iles, Sr. | 99/455 X |
| 4,948,614 | 8/1990 | Feldpausch | 426/565 |

*Primary Examiner*—Mark Rosenbaum
*Assistant Examiner*—Frances Chin
*Attorney, Agent, or Firm*—Mark C. Jacobs

[57] ABSTRACT

Apparatus for making frozen foods including a mastication chamber, a frozen food material feeder leading into the mastication chamber, a masticator disposed in the chamber and an aeration chamber for introducing air into masticated frozen food fed into the aeration chamber. The whipped frozen food is then disposed into either a storage bin or remote location.

18 Claims, 3 Drawing Sheets

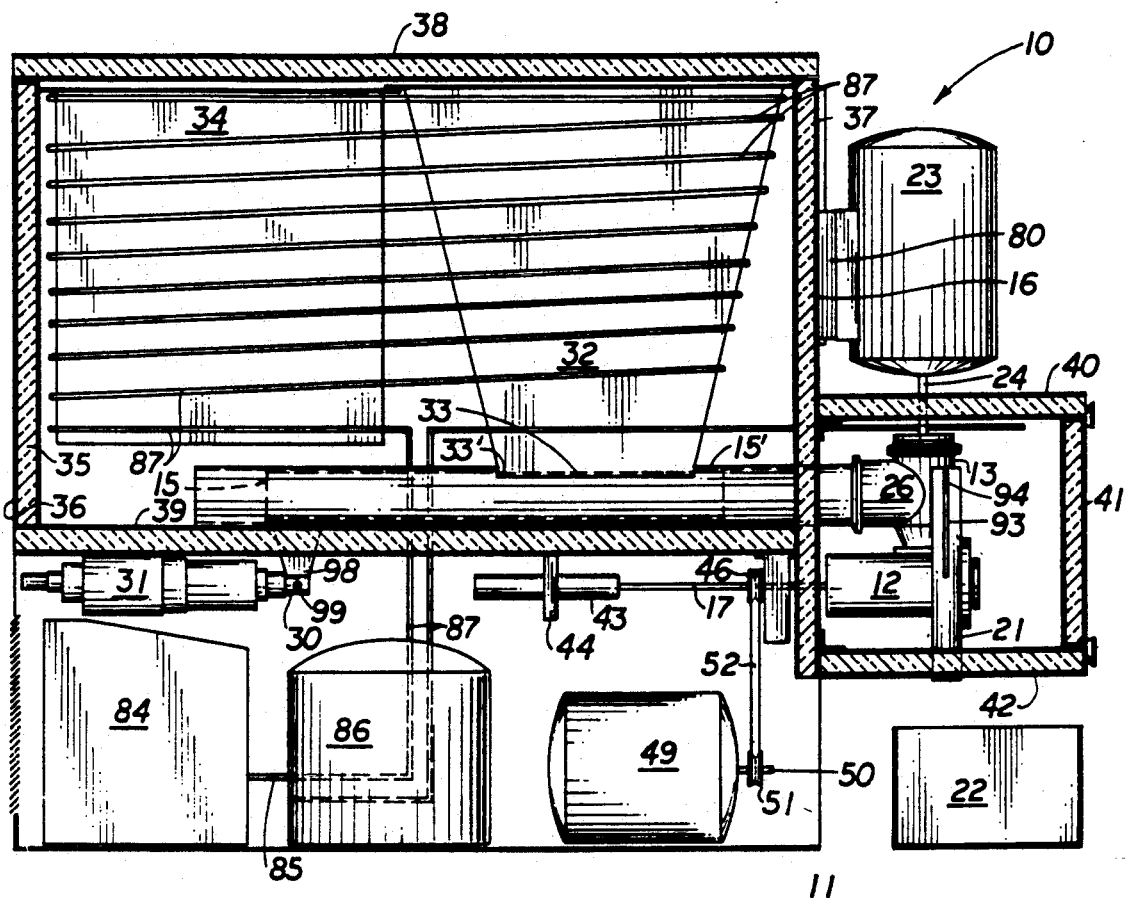
FIG. 1
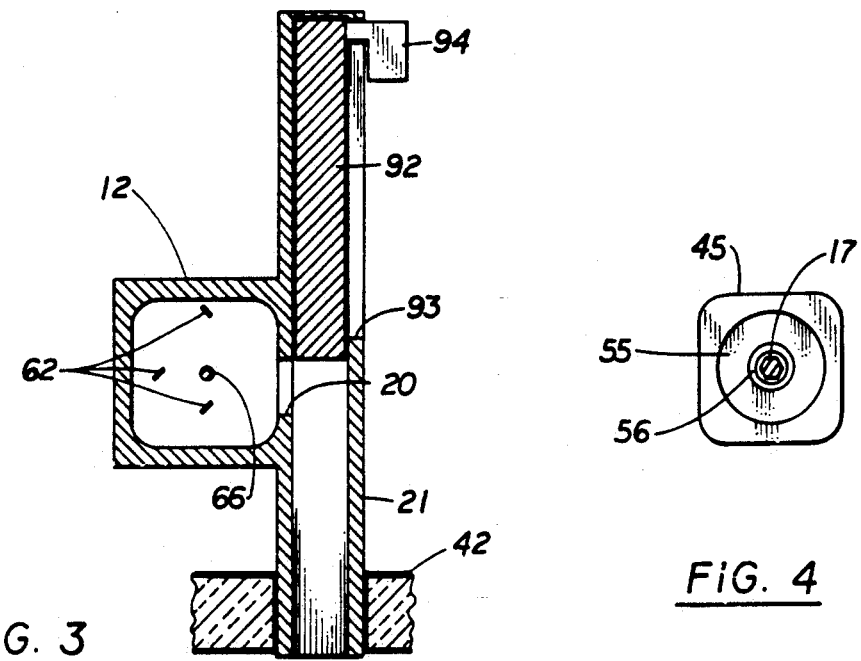
FIG. 3
FIG. 4

APPARATUS FOR MAKING FROZEN FOODS

FIELD OF THE INVENTION

The invention relates to frozen food apparatus; and, more particularly, to apparatus for forming frozen desserts.

DESCRIPTION OF THE PRIOR ART

In my U.S. Pat. No. 4,948,614, I disclose a frozen non-dairy dessert, specifically, a frozen non-dairy dessert having the creamy texture and mouth feel of an ice cream product. In this process, a frozen food mixture, such as bananas, is masticated, then whipped to achieve a significant overrun to form the final product. In my copending application Ser. No. 07/534,352, filed Jun. 5, 1990 now U.S. Pat. No. 6,098,781 issued Mar. 24, 1992, and, the dessert itself is claimed.

Various devices have been suggested over the years for forming frozen products, such as dessert products as ice cream. An ice cream freezer is disclosed in U.S. Pat. No. 749,286 to Gerner. Such apparatus is quite complex and the can itself is rotated during the process. In. U.S. Pat. No. 2,132,364 to Thompson, apparatus is disclosed for forming ice cream wherein air is introduced to create an overrun. Such apparatus is quite complex and a liquid mix is fed into the air chamber. In U.S. Pat. Nos. 2,864,419 to Woock and 3,976,001 to Trovlager, conventional juicers are disclosed. The foodstuffs prepared therein are not frozen and no air is introduced. In Thomas, U.S. Pat. No. 2,513,974, a juice extractor is disclosed in which the ground-up food is merely fed by gravity to the operating chamber, not pushed as may be necessary with masticated solids. Finally, in Carpigiani, U.S. Pat. No. 3,818,716, an ice cream machine is disclosed where the food material is frozen in a cylinder and not thereafter masticated.

There is a need for an apparatus for forming such desserts. Such apparatus should be simple to use, economical and relatively easy to manufacture.

BRIEF DESCRIPTION OF THE FIGURES

FIG. 1 is a vertical sectional view of apparatus in accordance with the teachings of the invention;

FIG. 3 is a view taken along lines 3—3 of FIG. 2;

FIG. 4 is a vertical sectional view taken along line 4—4 of FIG. 2 of the piston alone of the apparatus of FIGS. 1 to 3;

SUMMARY OF THE INVENTION

It is an object of this invention to provide apparatus for forming a frozen food product.

It is a further object of this invention to provide apparatus for forming a whipped frozen dessert.

It is still further an object of this invention to provide apparatus wherein a frozen food product is masticated, then air is introduced therein as by whipping to achieve a significant overrun to form the final product.

These and other objects are preferably accomplished by providing a hopper, a frozen food material feeder leading into a mastication chamber, a masticator disposed in the chamber and an aeration chamber for introducing air into masticated frozen food. The whipped frozen food is then disposed into a storage bin, or may be delivered for immediate consumption, or moved to a storage area.

DESCRIPTION OF THE PREFERRED EMBODIMENT

Figures 2, 5:
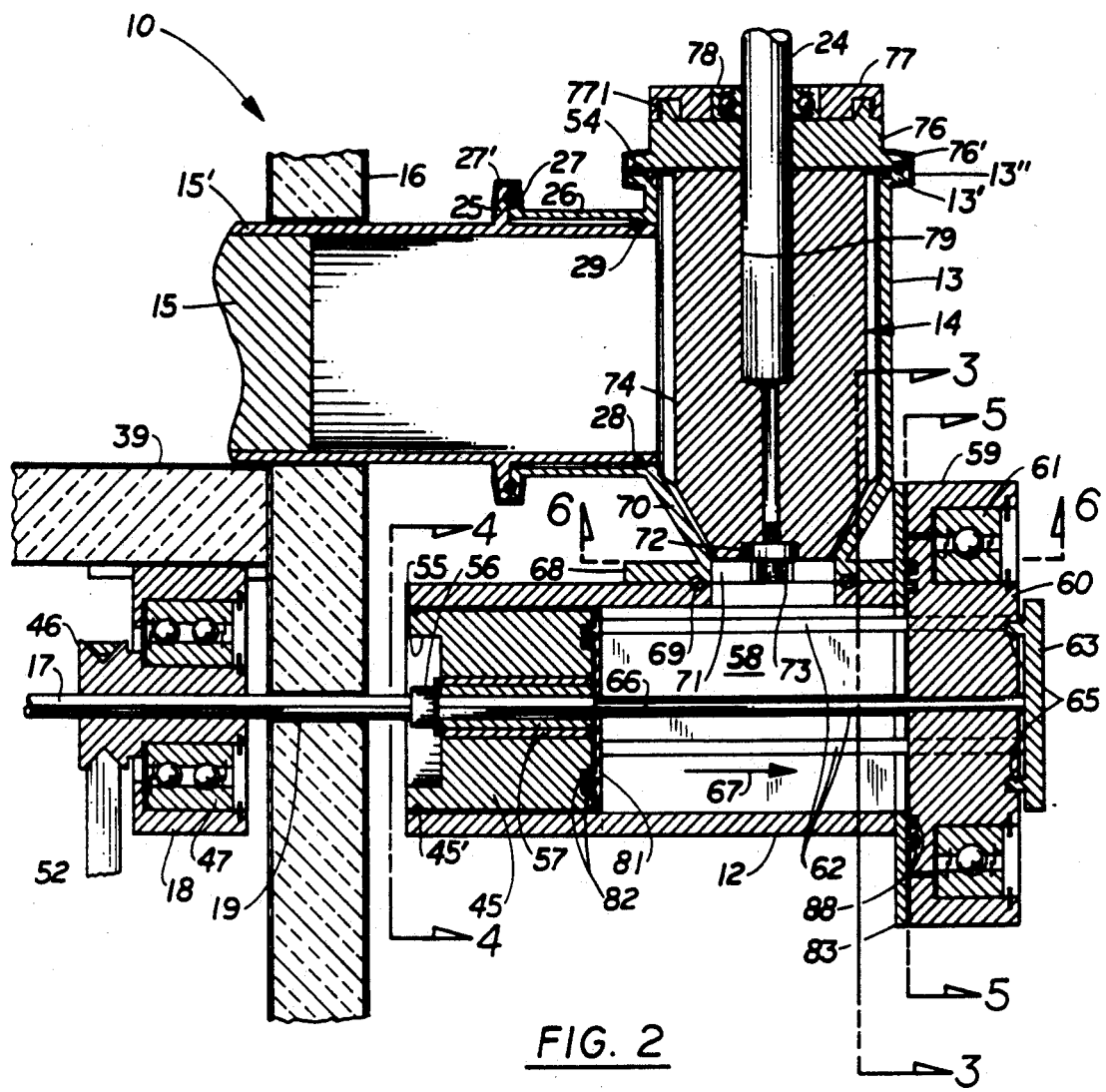
FIG. 2 is a vertical sectional view of the apparatus of FIG. 1.
FIG. 5 is a view taken along lines 5—5 of FIG. 2.

Referring now to FIG. 1 of the drawing, apparatus 10 is shown having a housing 11 having an aeration chamber 12 mounted thereon (see FIG. 2). A mastication chamber 13 is in fluid communication with the interior of chamber 12 and a masticator 14 is disposed internally of mastication chamber 13. A compression chamber 15' having a plunger 15 therein leads into a mastication chamber 13 which is supported by vertical housing support wall 16. A hexagon configured plunger shaft 17 extends through a suitably configured bearing support 18, through an opening 19 in vertical housing support 16, and into the interior of aeration chamber 12. An opening 20 is provided in chamber 12 (see also FIG. 3) which chamber is coupled to a discharge tube 21 leading into a bin 22 for storing the finished product. As particularly seen in FIG. 1, a motor 23 is operatively coupled via drive shaft 24 to masticator 14 mounted in mastication chamber 13. Alternatively rather than storing finished product, it may be dispensed via tube 21 for consumption. The housing further includes a refrigerating means for both cooling and maintaining the housing at a predetermined temperature.

Compression chamber 15', seen in FIG. 2, is a generally cylindrical tube which has a peripheral flange 25 thereon. This flange couples to flange 27 mounted on the inlet tube 26 which leads into the side of mastication chamber 13. Flanges 25, 27 are used to stop and seal the inlet 26 leading into mastication chamber 13 to compression chamber 15'. When they are fitted together, clamp 27' is used to clamp them together. See FIG. 2. Plunger 15 reciprocates within chamber 15' per FIG. 1. Chamber 15' also has a peripheral groove 28 receiving therein a resilient o-ring 29. As seen in FIG. 1, a bracket 98 is connected to one end of plunger 15 and is pivotally connected, via pivot pin 99, to the piston shaft 30 of a motor 31. Thus, as motor 31 is selectively activated, piston shaft 30 moves feed plunger 15 forward or rearward.

A feed bin 32 (FIG. is disposed in housing 11 communicating at the bottom 33 with the interior of compression chamber 15' and thus extending down about ⅛ the distance from the crest of plunger 15 through opening 33'. Bin 34 is provided for storage only. As seen in FIG. 1, suitable insulation 35 may be provided in the side walls 36, 16, top and bottom walls 38, 39, respectively and walls 40 to 42 about chamber 12 of housing 11 for insulating the frozen material, such as bananas which is stored in hoppers 32, 34.

As seen in FIG. 1, plunger shaft 17 is coupled to an actuator mechanism 43, secured to bottom wall 39 by bracket 44, for laterally moving plunger or piston 45 disposed internally of chamber 12. Shaft 17 extends through a pulley sheave 46 (FIG. 2) mounted in bearing support 18. A bearing 47 surrounds sheave 46 having shaft 17 extending therethrough. Shaft 17 is keyed to sheave 46 via its hexagon shape for rotation therewith. As seen in FIG. 1, a motor 49 is mounted in housing 11 below wall 39 having a motor shaft 50 coupled to a pulley sheave 51 coupled via flexible belt 52 to sheave 46. Thus, actuation of motor 49 rotates pulley sheave 51 which in turn rotates sheave 46 to rotate shaft 17. Referring again to FIGS. 1 and 2, shaft 17 extends into aeration chamber 12 and is coupled directly to piston 45. As seen in FIG. 3, the inner wall of chamber 12 is generally square-shaped with rounded corners to provide a thorough mixing. FIG. 3 shows the aeration chamber 12, the opening 20 in the chamber 12 leading to the discharge tube 21. Within discharge tube 21 which is sealed at its uppermost end is cleaner-plunger 92. At the upper end of cleaner-plunger 92 is its operating arm 94 which slides within slot 93 the bottom end of which slot acts as a stop for the action of the plunger-cleaner 92. As seen in FIG. 4, the piston 45 is similarly configured.

Referring again to FIG. 2, piston 45 has a rear undercut portion 55 with a lock nut 56 mounted on shaft 17. Shaft 17 extends through an elongated bearing 57 mounted in a throughbore in piston 45. Shaft 17 is machined to a smaller round cross section at the rear side of plate 81, extends through plate 81 and into the open space 58 within chamber 12 between piston 45 and a bearing member 60 which in turn closes off the open end of chamber 12, thence through bearing housing 59 where shaft 17 attaches to plate 63.

As seen in FIG. 5, bearing housing 59 has a centrally mounted bearing member 60, journalled for rotation within housing 59 by bearing 61 (FIG. 2). A plurality of spaced mixing blades 62, such as three, extend through bearing member 60 to a mounting plate 63 on the exterior of housing 59. Plate 63 is adapted to limit movement to the left in FIG. 2 of shaft 17 as will be discussed. Blades 62 extend through suitable apertures 64, of like configuration to blades 62 so that the rotation of blades 62 rotates member 60 (see FIG. 5), in bearing housing 59. Blades 62 may be rectangular in cross-section. Blades 62 are fixed to plate 81 (FIG. 2) which is sealed to piston 45 by suitable seals 82. Plate 63 may have one or more spaced knobs or bosses 65 (FIG. 2) which prefit into like spaced holes in bearing member 60 to add strength to bearing member 60 when it rotates. A seal 45' may also be provided between piston 45 and the inner wall of chamber 12. Thus, seals 82, 45' prevent material from escaping back to the rear area behind piston 45. In like manner, shaft 17 is machined to a smaller round cross-section 66 between piston 45 and bearing housing 59. Shaft 17 and its smaller diameter portion 66 also extend through bearing member 60 to attach to plate 63. Plate 63 thus moves away from housing 59, when piston 45 is moved linearly within chamber 12 in the direction of arrow 67. Bearing member 60 abuts on its rearmost side seal plate 83 which is attached to bearing housing 59. Seal plate 83 is also attached to aeration chamber 12. The seal plate 83 prevention material from escaping the aeration chamber on its outer most end by incorporating seals 88.

Mastication chamber 13 is coupled to chamber 12 by a flange plate 68 and a resilient seal 69 is provided between plate 68 and chamber 12. As seen in FIG. 2, the lower end 70 of mastication chamber 13 leads to an opening 71 communicating with the interior of space 58 of chamber 12.

Figure 6:
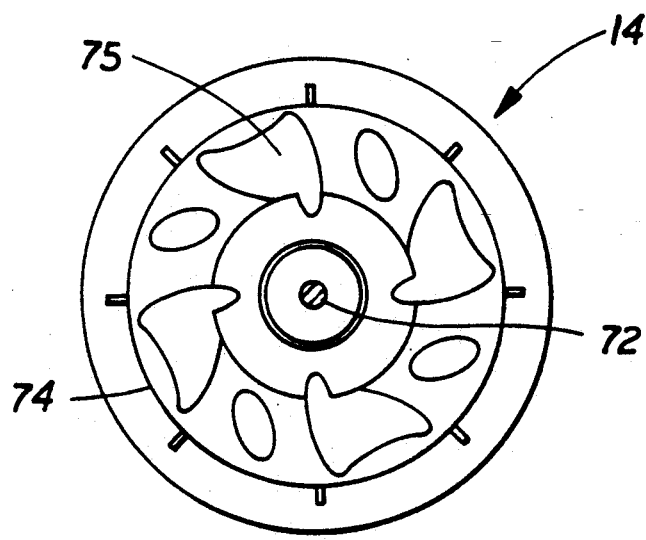
FIG. 6 is a view taken along lines 6—6 of FIG. 2.

Masticator 14 is mounted internally of mastication chamber 13, having a shaft 72 keyed to a like configured opening 73 at the bottom of mastication chamber 13. A rotor assembly 74 is disposed in masticator 14 having a plurality of spaced cutting blades 75 (see FIG. 6) adapted to masticate any material introduced into masticator 14 which moves rotatably. Mastication chamber 13 is closed off at the top by a top cover plate 76 having circular flange 76' secured to circular flange 13' on chamber 13 by clamp 13" (FIG. 2) and is sealed by side 54. A bearing plate 77 is mounted on plate 76 and threads thereto at threads 771. A bearing assembly 78 mounted in plate 77 (top of FIG. 2) surrounds a longitudinal irregularly configured (such as hex shaped) opening 79 in masticator 14. This assembly is adapted to receive therein like configured motor shaft 24 (FIG. 1) of motor 23 rotatable within bearing assembly 78 as heretofore discussed. Actuation of motor 23 thus activates masticator 14 to masticate via blades 75 any materials within mastication chamber 13. Motor 23 may be secured to housing 11 via support member 80.

Any suitable dimensions may be used. For example, the interior of aeration chamber 12 may have a 6 ounces capacity and the interior of mastication chamber 13 may have a 4 ounce capacity. Any suitable motor means may be used, such as a 1750 rpm motor 23 for actuating masticator 14 and a like motor 49 for actuating pulleys 51, 46. Any suitable masticator may be used, such as the masticators discussed in U.S. Pat. Nos. 3,976,001 and 2,864,419.

A compressor 84 may be mounted in housing 11 coupled, via line 85, to a refrigeration unit 86 coupled via cooling lines 87 to compression chamber 15'. Cooling lines also circumnavigate bins 32 and 34.

OPERATION

In operation, the food material, such as frozen bananas in hopper 32, are fed out of opening 33 into compression chamber 15', that is plunger 15 is backed up to allow the frozen bananas in hopper 32 to fall into the opening 33' leading into compression chamber 15', then the plunger 15 is moved forward, actuated by motor 31, toward mastication chamber 13, pushing the feed therein Motor 23 actuates masticator 14 which masticates the feed via blades 75 and the masticated feed falls through opening 71 into the interior of aeration chamber 12. Motor 49 rotates shaft 17, at any desired speed, such as 1200 rpm. Blades 62 coupled to plates 81 and 63 aerate the masticated feed within chamber 12. Upon actuation of actuator 43, ram piston 45 is moved in the direction of arrow 67 forcing the aerated masticated feed into opening 20 and thus out of exit tube 21 to bin 22. (See FIG. 3)

Figure 7:
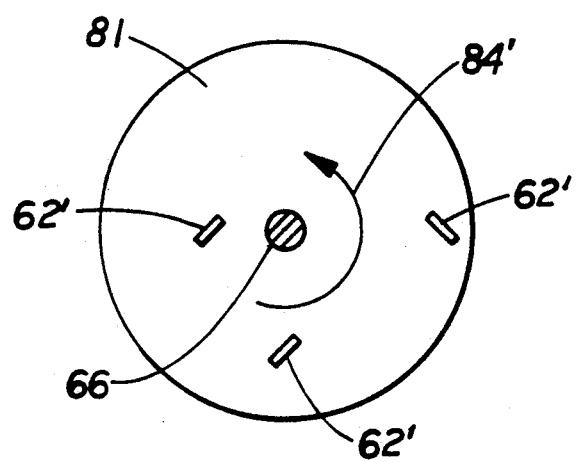
FIG. 7 is a vertical view of the blade plate and blade holes of the apparatus of FIG. 1 removed from the apparatus thereof for convenience of illustration.

Blades 62 can be of any suitable number and located at any suitable position on disc plate 81. Preferably it has been found that three are preferred for ease in assembly and maintaining in a clean manner. As seen in FIG. 7, blade holes 62' adapted to receive blades 62 therein are irregularly spaced about disc plate 81 and cocked at an angle. The preferred direction of rotation of blades 62, as indicated by arrow 84', is counterclockwise when looking in the direction of piston 45 from the interior of chamber 12. The outer most blade 62 turns in the direction of pitch to throw product in an outward direction. There is no criticality to the pitch of blades 62. However, blades set at about 45 degrees give acceptable results.

The apparatus disclosed herein will make a tasty frozen dessert with a good mouth feel and few ice crystals. The aeration chamber adds air and thus volume to the masticated feed, e.g., four ounces of solids entrains two ounces of air to become six ounces of final frozen dessert product. The use of rounded corners in chamber 12 and like rounded corners on piston 45 provides an even mix of air without air bubbles. As seen in FIG. 7, one of the blades 62 is disposed adjacent the outer periphery of disk plate 81 so that it scrapes relatively close to the inner wall of chamber 12.

Freon or the like may be used for cooling, preferably, apparatus 10 is maintained at zero degrees Fahrenheit. Suitable temperature gauges, thermostats, and controls may be provided as known in the art.

Any desired overrun may be obtained by merely varying the quantity of masticated material introduced into chamber 12. Thus, if chamber 12 has a six ounce internal capacity and four ounces of product to be introduced, a 50 per cent overrun is obtained. It is seen that the volume of mix introduced expands to fill the capacity of the chamber 12. The apparatus disclosed herein entrains all the air without leaving air pockets.

The motors may have suitable rheostats or the like associated therewith for regulating the speeds thereof. Suitable easy to open clamps may be used to secure the various parts together while permitting unclamping of the same for ease of cleaning. Any suitable construction materials may be used, such as plastics, metals, etc.

The rounded corners of piston 45 and the interior of aeration chamber 12 results in obtaining the desired turbulence. Blades 62 may be welded to plates 63, 81, if desired, and may vary in number and spacing (preferably at least one blade being disposed adjacent the outer periphery of plates 63, 81). The centrally located round portion 66, of shaft 17 does not create any turbulence nor interfere with the turbulence caused by blades 62.

It can be seen that I have disclosed an apparatus for making frozen desserts wherein portion control and predetermined overrun can be easily carried out. The apparatus is simple and easy to operate and self-cleaning. Although a specific embodiment of the invention has been disclosed, variations thereof may occur to an artisan and the scope of the invention is only to be limited by the scope of the appended claims.

I claim:

1. Apparatus for making a frozen food product comprising:
   a main housing having a feed mastication chamber with a top and bottom and having an inlet and having an outlet at the bottom thereof;
   masticating means disposed in said mastication chamber for masticating food introduced into said mastication chamber;
   an aeration chamber having a rear end and a forward end, and being mounted in said housing in fluid communication with the outlet of said mastication chamber, said aeration chamber having an interior space in fluid communication with said mastication chamber outlet;
   a plurality of spaced shaft mounted rotatable aerating blades disposed in said aeration chamber extending into said space;
   a piston mounted in said aeration chamber linearly movable across the interior space of said aeration chamber from one end, the rear end, to the other end, the forward end thereof; and
   an aeration chamber outlet leading from said forward end of said aeration chamber.

2. In the apparatus of claim 1 wherein said aeration chamber is closed off at the front end thereof by a bearing housing, said bearing housing including a bearing member journalled for rotation in said bearing housing, said blades extending through aligned openings in said bearing housing.

3. In the apparatus of claim 2 wherein said blades extend through said bearing housing to a plate exterior of said aeration chamber, at the front end thereof said blades being fixedly secured to said exterior plate.

4. In the apparatus of claim 3 wherein the end of said blades remote from said exterior plate, are fixed to a plate mounted to said piston.

5. In the apparatus of claim 1 wherein said piston is coupled to a rotatable and linearly movable shaft extending out of said aeration chamber.

6. In the apparatus of claim 5 including motive means coupled to said shaft for selectively rotating said shaft and for moving said shaft linearly.

7. In the apparatus of claim 1 including refrigerating means associated with said housing at both cooling the same and maintaining said housing at a predetermined temperature.

8. In the apparatus of claim 1 wherein said aeration chamber has an inner wall surrounding said space, and three such blades are provided, at least one of the blades being disposed adjacent the inner wall of said chamber.

9. In the apparatus of claim 1 wherein said blades are rectangular in cross section.

10. In the apparatus of claim 9 wherein said blades are angled from one another.

11. In the apparatus of claim 9 wherein said blades rotate in a counterclockwise direction looking toward said piston from the interior of said aeration chamber.

12. In the apparatus of claim 9 wherein said blades rotate in a clockwise direction looking toward said piston from the interior of said aeration chamber.

13. In the apparatus of claim 9 wherein the pitch of the blades is about 45 degrees.

14. In the apparatus of claim 1 wherein said aeration chamber has an inner wall surrounding said space, said inner wall being substantially rectangular in cross section, said piston also being substantially rectangular is cross section and substantially conforming to said inner wall.

15. In the apparatus of claim 14 wherein the corners of both said inner wall and said piston are rounded.

16. In the apparatus of claim 1 including a feed bin having a top and bottom with an opening at the bottom in fluid communication with a compression chamber, which in turn has an opening leading into said mastication chamber.

17. In the apparatus of claim 16 including a plunger associated with said compression chamber for selectively pushing feed from said bin entering said compression chamber into said mastication chamber.

18. In the apparatus of claim 1 wherein said piston is coupled to a rotatable piston shaft extending out of said aeration chamber, said blades being coupled at one end thereof to said piston for rotation therewith and being coupled at the other end thereof to a plate mounted on the exterior of said aeration chamber, at the front end thereof, said blades extending through aligned openings in a rotatable bearing member closing off said one end, the front end, of said aeration chamber, rotation of said blades rotating said bearing member, and a shaft interconnecting said plate and said bearing member coaxially aligned with said first mentioned shaft, said blades being spaced outwardly away from said second mentioned shaft.

* * * * *